(12) United States Patent
Sedlak

(10) Patent No.: US 9,960,681 B2
(45) Date of Patent: May 1, 2018

(54) MULTI-PHASE BUCK SWITCHING POWER SUPPLY

(71) Applicant: Efficient Energy GmbH, Feldkirchen (DE)

(72) Inventor: Holger Sedlak, Sauerlach (DE)

(73) Assignee: Efficient Energy GmbH, Feldkirchen (DE)

( * ) Notice: Subject to any disclaimer, the term of this patent is extended or adjusted under 35 U.S.C. 154(b) by 0 days. days.

(21) Appl. No.: 15/654,618

(22) Filed: Jul. 19, 2017

(65) Prior Publication Data

US 2017/0317591 A1    Nov. 2, 2017

Related U.S. Application Data

(63) Continuation of application No. PCT/EP2016/050987, filed on Jan. 19, 2016.

(30) Foreign Application Priority Data

Jan. 19, 2015  (DE) .................. 10 2015 200 716

(51) Int. Cl.
*H02M 1/084* (2006.01)
*H02M 3/158* (2006.01)
(Continued)

(52) U.S. Cl.
CPC .......... *H02M 3/1584* (2013.01); *H02M 7/003* (2013.01); *H02M 2001/0058* (2013.01); *H02M 2003/1586* (2013.01); *Y02B 70/1491* (2013.01)

(58) Field of Classification Search
CPC ........ H02M 1/08; H02M 3/156; H02M 3/158; H02M 3/1584; H02M 2003/1586; H02M 3/1588

(Continued)

(56) References Cited

U.S. PATENT DOCUMENTS 5,929,692 A  *  7/1999  Carsten ................... H02M 1/15
                                                          323/271
8,023,276 B2     9/2011  Otremba
(Continued)

FOREIGN PATENT DOCUMENTS

DE      102005049978 A1    4/2007
DE      102011116692 A1    4/2013
(Continued)

OTHER PUBLICATIONS www.vishay.com; Aluminum Capacitors 105 Celsius, Miniature, Radial Lead, 2012, 1-6.
(Continued)

*Primary Examiner* — Jeffrey Sterrett
(74) *Attorney, Agent, or Firm* — Michael A. Glenn; Perkins Coie LLP

(57) ABSTRACT

A switching power supply includes a plurality of parallel branches, each parallel branch including two serially connected controllable switches and a coil connected between the two switches and an output node, a capacitor connected between the output node of the parallel branches and ground; and a controller configured to switch the two serially connected controllable switches of each parallel branch such that a first switch of a parallel branch is switched from a conducting state to a non-conducting state when a current flowing through a coil of the parallel branch reaches a first current value larger than 5 A, and such that the second switch is switched from a conducting state to a non-conducting state when the current flowing through the coil of the parallel branch reaches a second current value smaller than 0 A.

13 Claims, 14 Drawing Sheets

(51) Int. Cl.
*H02M 1/00* (2006.01)
*H02M 7/00* (2006.01)

(58) Field of Classification Search
USPC ........................................ 323/271, 272, 282
See application file for complete search history.

(56) References Cited

U.S. PATENT DOCUMENTS

| | | |
|---|---|---|
| 2007/0090814 A1 | 4/2007 | Hashimoto et al. |
| 2013/0033351 A1 | 2/2013 | Kim et al. |
| 2013/0038303 A1 | 2/2013 | Krause |
| 2014/0266131 A1 | 9/2014 | Deboy et al. |
| 2014/0312868 A1 | 10/2014 | Dally |
| 2015/0162828 A1* | 6/2015 | Sandner ................ H02M 3/158 323/271 |
| 2015/0214859 A1* | 7/2015 | Chen ................ H02M 7/53873 363/132 |
| 2015/0280563 A1* | 10/2015 | Tang .................... H02M 3/158 323/271 |
| 2015/0303802 A1* | 10/2015 | Childs .................. H02M 3/158 323/271 |
| 2016/0049874 A1* | 2/2016 | Kobayashi ............ H02M 3/157 323/271 |
| 2016/0211750 A1* | 7/2016 | Coleman ................ H02M 1/15 |
| 2017/0248996 A1* | 8/2017 | Zhang ....................... G06F 1/26 |
| 2017/0317591 A1* | 11/2017 | Sedlak ................ H02M 3/1584 |

FOREIGN PATENT DOCUMENTS

| | | |
|---|---|---|
| WO | 2005022737 A1 | 3/2005 |
| WO | 2013060421 A1 | 5/2013 |

OTHER PUBLICATIONS

Li, Jieli et al., "Using Coupled Inductors to Enhance Transient Performance of Multi-Phase Buck Converters", IBM Symposium, Sep. 2004, 1-25.

Lun, L.C., "Designing for Board Level Electromagnetic Compatibility", Freescale Semiconductor, Rev 1. AN2321, Oct. 2005, 1-36.

Grundschaltungen der Elektrotechnik 6. In: Funkschau-Arbeitsblätter; 1987; ISSN 0724-6293; Franzis-Verlag GmbH, Karlstrasse 37-41, 8000 Muenchen 2; pp. 9, 70, 71.

* cited by examiner

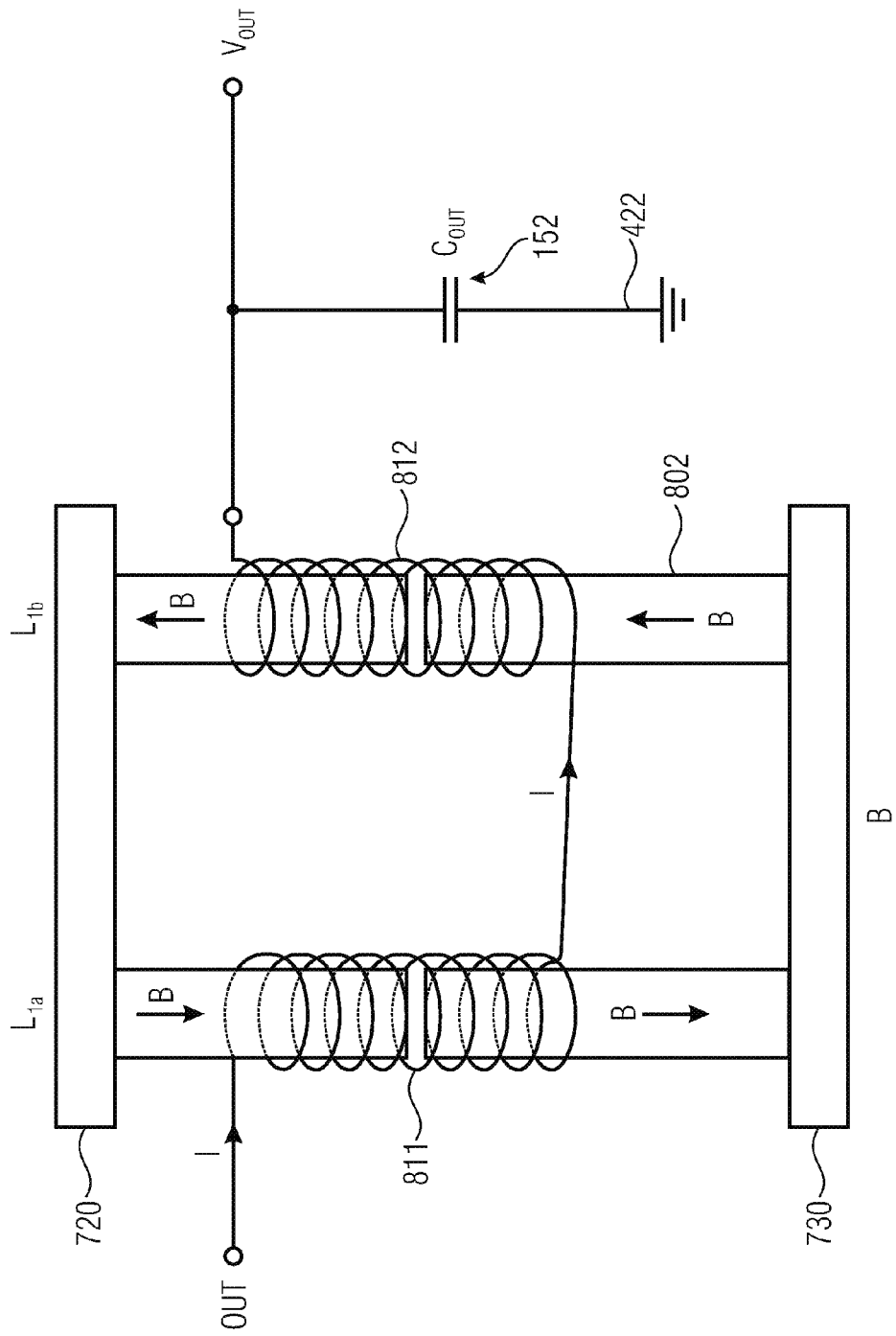

MULTI-PHASE BUCK SWITCHING POWER SUPPLY

CROSS-REFERENCE TO RELATED APPLICATIONS

This application is a continuation of copending International Application No. PCT/EP2016/050987, filed Jan. 19, 2016, which is incorporated herein by reference in its entirety, and additionally claims priority from German Application No. DE 102015200716.2, filed Jan. 19, 2015, which is incorporated herein by reference in its entirety.

The present invention relates to electronic circuits and in particular to switching power supplies for providing powers within the kilowatt range.

BACKGROUND OF THE INVENTION

Switching power supplies have been known. In particular, there are so-called buck converters, or step-down converters. So-called multi-phase buck converters have been known specifically for supplying CPUs on computer boards. Such multi-phase switching power supplies comprise circuit topologies wherein buck converter circuits are connected in parallel between the input and the load. Each of the n "phases" is switched on at uniformly spaced-apart intervals within a switching period. Such so-called multi-phase buck converters have been known, for example, from the specialist publication "Using Coupled Inductors to Enhance Transient Performance of Multi-Phase Buck Converters", J. Li, et al., IBM Symposium, Sep. 14-15, 2004, pages 1-25.

In particular with switching power supplies that have to switch relatively high powers it is highly important with regard to electromagnetic compatibility, on the one hand, and with regard to power consumption and overall performance, i.e. also with regard to efficiency, on the other hand, to achieve a large degree of electromagnetic compatibility and high efficiency, or low power consumption. On account of the inherently transient processes occurring within switching power supplies it is highly important to think not only in terms of the output voltage, or the output current, but to consider also charge reversal processes and associated magnetic fields when designing the switching power supply as well as its components.

SUMMARY

According to an embodiment, a switching power supply may have: a plurality of parallel branches, each parallel branch having two serially connected controllable switches and a coil connected between the two switches and an output node; a capacitor connected between the output node of the parallel branches and ground, and a controller configured to switch the two serially connected controllable switches of each parallel branch such that a first switch of a parallel branch is switched from a conducting state to a non-conducting state when a current flowing through a coil of the parallel branch reaches a first current value larger than 5 A, and such that the second switch is switched from a conducting state to a non-conducting state when the current flowing through the coil of the parallel branch reaches a second current value smaller than 0 A, an LC filter having a filter capacitor and a filter coil and being connected upstream from the plurality of parallel branches, so that an input node of each parallel branch is connected to a first terminal of a filter capacitor and to a first terminal of a filter coil, a second terminal of the filter capacitor being connected to a ground terminal, and a second terminal of a filter coil being connected to an input node of the switching power supply, wherein the filter capacitor has a positive terminal, a negative terminal, and a third terminal, the third terminal having an elongated lead connected to the negative terminal and being arranged at least partly next to the positive terminal, a board, the filter capacitor being arranged on one side of the board and the switches and the coils being arranged on another side of the board, a positive terminal of the filter capacitor extending through a bore through the board, the third terminal, which has a ground path, being arranged, on the one side of the board, next to the bore within the board for the positive terminal, and one or several ground terminals of the second switches extending through the board and being connected to the third terminal of the filter capacitor.

According to another embodiment, a method of operating a switching power supply having a plurality of parallel branches, each parallel branch having two serially connected controllable switches and a coil connected between the two switches and an output node; and a capacitor connected between the output node of the parallel branches and ground, an LC filter having a filter capacitor and a filter coil and being connected upstream from the plurality of parallel branches, so that an input node of each parallel branch is connected to a first terminal of a filter capacitor and to a first terminal of a filter coil, a second terminal of the filter capacitor being connected to a ground terminal, and a second terminal of a filter coil being connected to an input node of the switching power supply, wherein the filter capacitor has a positive terminal, a negative terminal, and a third terminal, the third terminal having an elongated lead connected to the negative terminal and being arranged at least partly next to the positive terminal, a board, the filter capacitor being arranged on one side of the board and the switches and the coils being arranged on another side of the board, a positive terminal of the filter capacitor extending through a bore through the board, the third terminal, which has a ground path, being arranged, on the one side of the board, next to the bore within the board for the positive terminal, and one or several ground terminals of the second switches extending through the board and being connected to the third terminal of the filter capacitor, may have the steps of: controlling the two switches of each parallel branch such that a first switch of a parallel branch is switched from a conducting state to a non-conducting state when a current flowing through a coil of the parallel branch reaches a first current value larger than 5 A, and such that the second switch is switched from a conducting state to a non-conducting state when the current flowing through the coil of the parallel branch reaches a second current value smaller than 0.

The present invention is based on the finding that a switching power supply can meet such requirements if it is a multi-phase switching power supply and further comprises a specific type of current-dependent switchover, in particular with a negative current. The switching power supply includes a plurality of parallel branches, each parallel branch comprising two serially connected controllable switches and a coil connected between the two switches and an output node. In addition, a capacitor is provided that is connected between the output node of the parallel branches and ground. A controller is configured to switch the two switches of each parallel branch in such a manner that a first switch of a parallel branch is switched from a conducting to a non-conducting (blocking) state when a current flowing through a coil of this parallel branch reaches a first current value larger than 5 A, and that the second switch is switched from a conducting to a non-conducting state when the current flowing through the coil of the parallel branch reaches a second current value smaller than 0 A.

In this manner it is ensured that the current flowing through the coil passes through the ground line before it is switched over once again, and that it even is slightly negative. This ensures that free charge carriers in semiconductor elements such as in the switches or in free-wheeling diodes additionally provided on the switches, for example, are depleted as far as possible. In this manner, rapid switchover, on the one hand, and switchover that need not struggle against strong magnetic fields or electric fields, on the other hand, can be achieved. Thus, the power loss is considerably reduced, or minimized.

In accordance with another aspect of the present invention, a transistor stack circuit is employed which comprises a first transistor element comprising a first semiconductor area comprising a first front side on which a first source or emitter metallization is arranged and comprising a rear side on which a first drain or collector contact is formed, and comprising a first gate or base contact. A second transistor element is provided accordingly. The second transistor element is stacked onto the first transistor element, the second drain or collector contact being arranged to be stacked onto the first source or emitter metallization and being connected in a conducting manner. In addition, an output contact is connected to the second drain or collector contact and to the first source or emitter metallization.

Irrespective of which of the two stacked transistor elements is active, transport of electric current takes place nevertheless in the same direction, in relation to the entire transistor stack, so that magnetic fields do not interfere with one another on account of the currents flowing through the transistors, which may adopt quite considerable values since considerable amounts of powers are to be switched. In this manner, losses are eliminated and a fast switching behavior is achieved.

In accordance with a further aspect of the present invention, a capacitor is provided which comprises not only a first terminal lead for connecting a positive potential and a second terminal lead for connecting a negative potential, which have a dielectric arranged therebetween, but which additionally comprises a third terminal lead connected to the second terminal lead and extending along the first terminal lead and being insulated from the first terminal lead. Said third terminal lead is advantageously employed for contacting the switches connected to "ground" from the parallel branches, whereas the normal second terminal of the capacitor is used for contacting the actual circuit ground of the entire circuit. In this manner, it is also ensured that in all spatial areas of the circuit, corresponding currents flow which under certain circumstances need not struggle against one another and therefore need not discharge or charge different magnetic fields.

In accordance with a further aspect of the present invention, a coil array is provided which comprises a first rod (bar) comprising a first gap and a first winding around the first bar, a second bar comprising a second gap and a second winding around the second bar, as well as a lid element and a floor element, the windings of the coil array being able to form respective coils inside the parallel branches of the switching power supply. By coupling said coils accordingly in that they are configured inside a single coil array having a shared floor and lid element, it is possible to achieve that magnetic fields of almost similar sizes exist inside the volume of the coil array, even though currents are completely switched on continuously, are made to reach a maximum value and are then completely reduced to a value equal to 0 or even smaller than that.

Despite this extraordinarily large current swing, a system is obtained, by the inventive coil array arrangement, which entails only minimum losses and an excellent switching behavior despite having correspondingly large inductance values.

It shall be noted that the switching power supply and the individual aspects of the capacitor, of the transistor stack circuit and of the coil array are advantageously employed together. The switching power supply, however, may also be advantageously operated with alternative components. The same applies to the capacitor, the transistor stack circuit and/or the coil array. Said individual aspects may also be employed, independently of one another, in applications other than a switching power supply, it being particularly advantageous, however, to employ said elements together since in this case a particularly favorable low-loss performance will be achieved. Likewise, it is also possible to implement only two or three of the mentioned aspects without the remaining aspects inside a switching power supply or inside a different electronic circuit.

BRIEF DESCRIPTION OF THE DRAWINGS

Embodiments of the present invention will be detailed subsequently referring to the appended drawings, in which:

FIG. 6a shows an implementation of the switching power supply comprising a capacitor of, e.g., FIG. 5a;

FIG. 8c shows a detailed representation of the embodiment of FIG. 8a with the two coil sections $L_{1a}$ and $L_{1b}$ and their wirings.

DETAILED DESCRIPTION OF THE INVENTION

Figure 1:
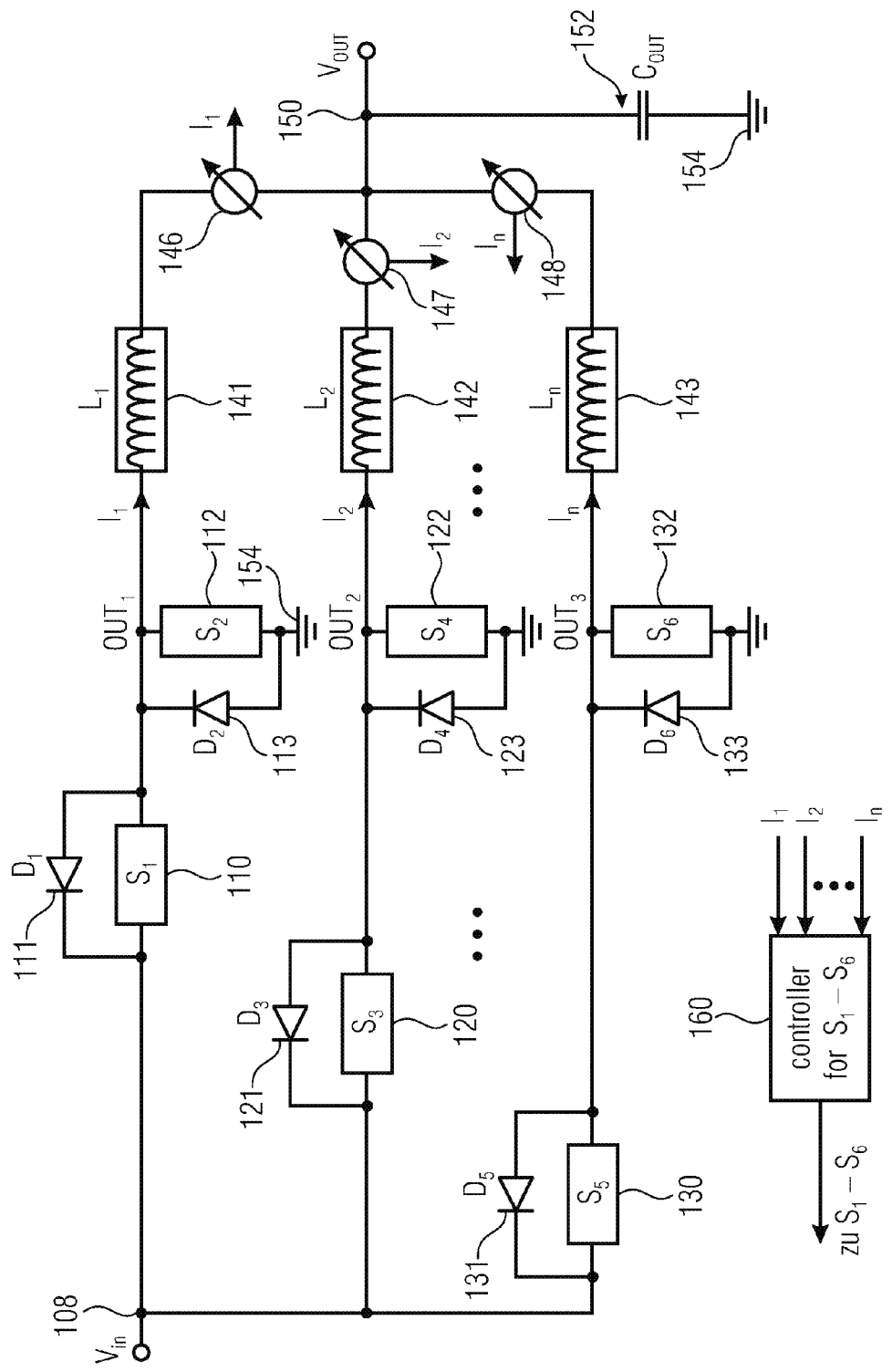
FIG. 1 shows a switching power supply in accordance with an embodiment of the present invention.

FIG. 1 shows a switching power supply in accordance with an embodiment of the present invention. In particular, a plurality of parallel branches are provided, each parallel branch comprising two serially connected controllable switches $S_1$, $S_2$ and $S_3$, $S_4$, and $S_5$ and $S_6$, respectively, and a coil $L_1$ and $L_2$, $L_n$, respectively, that is connected between the two switches, i.e., to a respective intermediate node $OUT_1$, $OUT_2$ and $OUT_3$, respectively, and an output node 150. In addition, a capacitor $C_{OUT}$ indicated by 152 is provided, said capacitor 152 being connected between the output node 150 of the parallel branches and a circuit ground 154. In addition, a controller 160 is provided which is configured to switch the two switches of each parallel branch such that a first switch is switched from a conducting state to a non-conducting state when a current flowing through a coil of the corresponding parallel branch reaches a first current value larger than 5 A and such that the second switch is switched from a conducting state to a non-conducting state when the current flowing through the coil of the parallel branch reaches a second current value smaller than 0 A. Thus, in an embodiment of the invention, the controller has an input for each current $I_1$, $I_2$, $I_n$, and in the embodiment shown in FIG. 1, it has an output for each switch $S_1$ to $S_6$.

In particular, in the embodiment shown in FIG. 1, the first parallel branch includes the two first switches 110, 112. A free-wheeling diode 111 and 113, respectively, is connected across the two switches. A first coil 141 is mounted on the node $OUT_1$, at which the first switch and the second switch $S_1$, $S_2$ are connected in parallel.

The second parallel branch consists of the first switch 120 and the second switch 122, which are also designated by $S_3$ and $S_4$ in FIG. 1, and of diodes 121 and 123 connected accordingly. In particular, the diodes are connected across the switches such that in the opposite direction, i.e., when a current flows back, a current flow via the diode can occur. Thus, when a current flow from the node $OUT_1$ is to flow to the input node 108, said current flow through the diode $D_1$ is enabled even when the switch $S_1$ is open. Analogous conditions are present at the other diodes. For example, when a current is to flow from the circuit ground 154, to which the switch $S_2$ 112 is connected, to the node $OUT_1$, said current flow is permitted, namely on account of the diode $D_2$ 113, even when the switch $S_2$ 112 is open. This behavior is advantageous in particular in that a negative current flowing through the coil $L_1$ is thereby enabled, said current being of considerable importance in achieving low-loss operation of the switching power supply, as will be illustrated below with reference to FIG. 2.

Advantageously, the controller 160 includes current sensors 146, 147, 148. The current sensors may be arranged either at the position, shown in FIG. 1, between the respective coils 141, 142, 143 and the output node 150. Alternatively, the current sensors may also be arranged between the intermediate nodes $OUT_1$, $OUT_2$, $OUT_3$ and the coils $L_1$, $L_2$, $L_n$, or at a different location, i.e., downstream from the one or other switch so as to somehow provide an indication of a current flowing through a corresponding coil. Depending on these current signals fed into the controller 160 via the inputs $I_1$, $I_2$, $I_n$, the switching signals $S_1$ to $S_6$ will then be set in the embodiment shown in FIG. 1. The current sensors may be configured in any manner desired, for example as Hall sensors in an implementation in which they are integrated with the transistor stack circuit, or as discrete elements.

Even though FIG. 1 shows three parallel branches by way of example, the switching power supply may also be configured with only two parallel branches or more than three parallel branches such as four, five, or six parallel branches, depending on the implementation.

Figure 2:
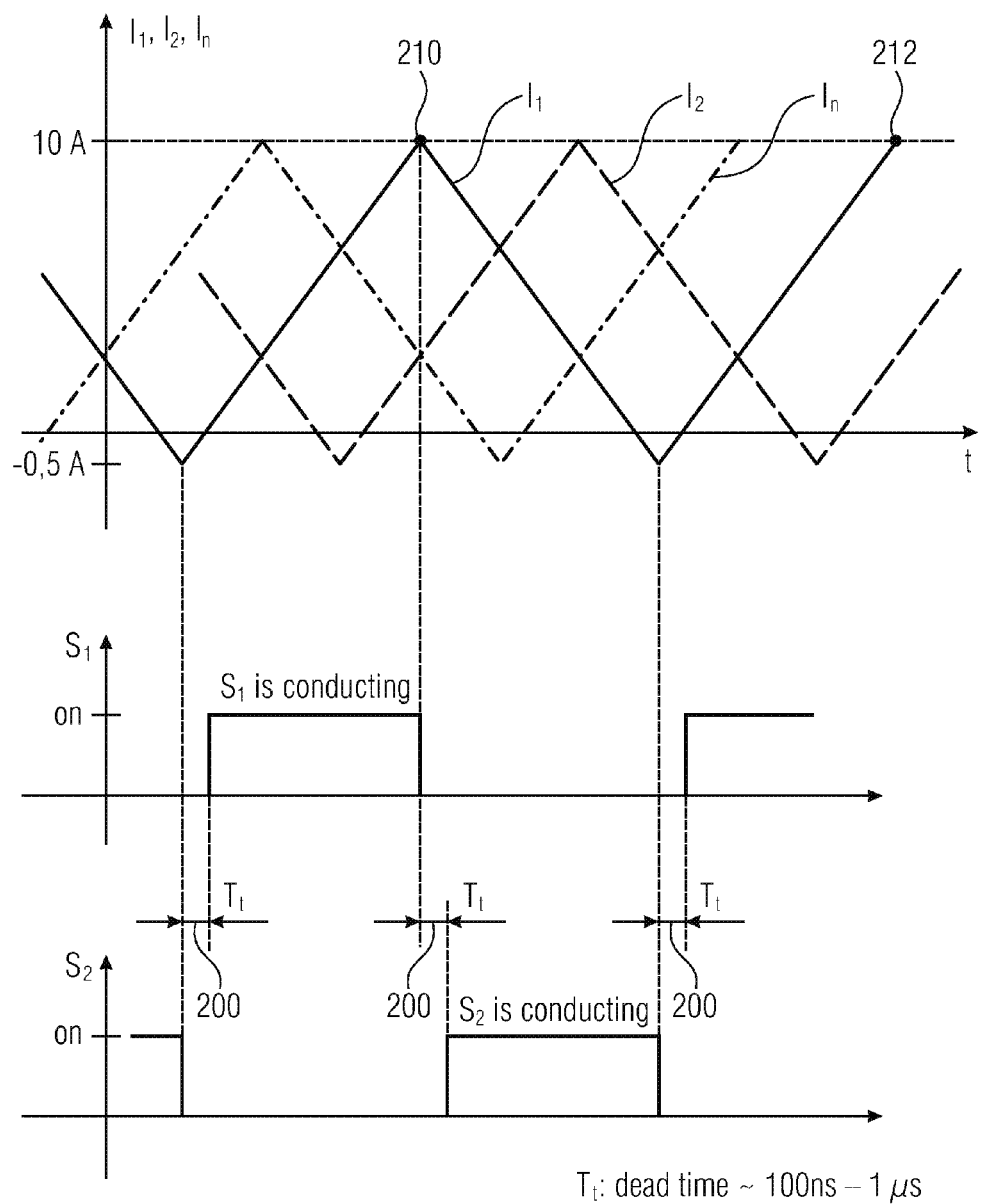
FIG. 2 shows a circuit diagram for showing switching of the switches inside a parallel branch and further current flows of the other parallel branches.

A current flow chart of the coil currents $I_1$, $I_2$, $I_n$ with regard to one another as a function of time t is shown in the upper diagram of FIG. 2. The lower diagram shows the corresponding control signals sent to the switches $S_1$, $S_2$ of the first parallel branch; the current $I_1$, which is a continuous line in the upper diagram of FIG. 2, flows inside the first parallel branch. The second parallel branch has the dashed-line current $I_2$ in the upper diagram of FIG. 2 associated therewith, and the third parallel branch has the current $I_n$ associated with it, which is represented by a dash-dotted line in the upper diagram in FIG. 2. This results in that the switching signals for the two switches inside the second branch and the third branch are configured analogously to the switching signals $S_1$, $S_2$ inside the first branch, however in a manner that is offset in time over a switching period. In addition, the upper diagram of FIG. 2 shows that the second switch $S_2$ is blocked advantageously at a value of −0.5 A. Said blocking is performed for a corresponding current value which in other embodiments may also range from −0.1 A to −1 A.

In addition, it is advantageous to switch off the first transistor $S_1$ when the maximum value of the current is 10 A, or is between 8 and 12 A. Advantageous values for the maximum current value are between 9 and 12 A, and for the minimum current value are between −0.2 and −2 A.

As was explained above, each switch is advantageously provided with a diode that is connected in parallel and is polarized such that a current smaller than 0 A can flow through the diode, as achieving the negative current values as shown in the upper diagram of FIG. 2 entails.

In addition, in a further embodiment of the present invention, the controller 160 is configured to switch the first switch of a parallel branch from a non-conducting to a conducting state, in manner that is delayed by a dead time, after switching the second switch from the conducting state to the non-conducting state; said dead time, which is shown at 200 in FIG. 2, is advantageously larger than 100 ns and smaller than 1 µs. Moreover, as can also be seen in FIG. 2, the controller is configured to switch the second switch of the parallel branch from the non-conducting state to the conducting state, in manner that is delayed by the dead time 200, after switching the first switch from the conducting state to the non-conducting state, said dead time also being larger than 100 ns and smaller than 1 µs. The dead times between the switching of $S_2$ and $S_1$ are advantageously the times between the switching of $S_1$ and $S_2$ in the center of FIG. 2, even though this need not necessarily be the case; the dead times may thus be different but should both be within the range mentioned.

As was explained, the controller 160 of FIG. 1 is further configured to switch the switches of a further parallel branch in a manner that is offset in time to the switches of the parallel branch, so that currents flowing through the coils of the parallel branch and of the further parallel branch are different. Generally speaking, the switching power supply includes a number k of parallel branches, k being larger than or equal to 2, and the controller being configured to drive the switches of the k parallel branches in a manner that is offset in time such that within a cycle, switch-off times of the switches are equally distributed, a cycle starting, for example, at the first current value such as 210, for example, for the first parallel branch, and ending at a temporally subsequent next instance of achieving said current value, i.e. at 212.

This shows that within this cycle, each of the currents $I_2$ and $I_n$ has a minimum value and a maximum value. In addition, it is advantageous for the switching phases of the individual parallel branches to be uniformly distributed, i.e., that the period between the point 210 and the point 212 be subdivided, from a temporal point of view, into k parts, k being equal to 3 in FIG. 2, and that the individual parallel branches reach their respective maximum current and, thus, the switch-off time of the first switch at a time that is offset, in relation to another parallel branch, by the time period 1/k times the switching period plus/minus a tolerance of 10 percent of said value, i.e., the time period between 210 and 212. If a period has a length of, for example, 4 microseconds and if k=4 branches are used, the maximum values and/or minimum values and/or zero crossings, etc. of the current flows are temporally spaced apart from one another by 1 microsecond plus/minus 10%, i.e., by 0.9 microseconds to 1.1 microseconds.

As was already explained, the switching power supply that is shown in FIG. 1 and the switching behavior of which is shown in FIG. 2 is intended to provide output powers that are higher than 2 kW and advantageously higher than 5 kW. The advantageous load is a rotating field generator as is used for driving a turbocompressor of a heat pump that has high rotational speeds.

Figure 3A:
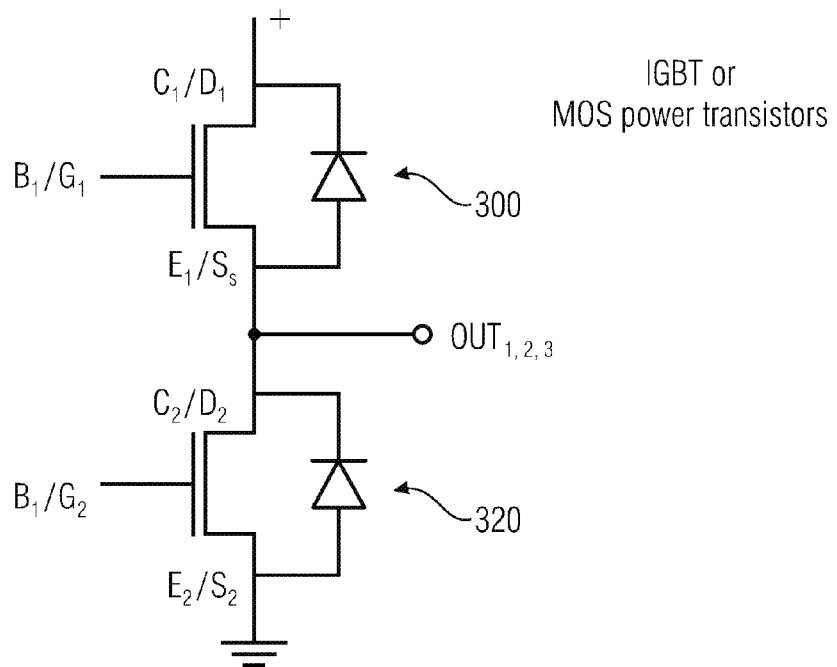
FIG. 3a shows a representation of the serially connected controllable switches inside a parallel branch.

Therefore, the switches provided inside the parallel branches are configured as power transistors. FIG. 3a shows an implementation of the two switches as IGBTs (Insulated Gate Bipolar Transistors) or as MOS power transistors. It is advantageous, in particular, that each switch $S_1$ to $S_6$ be implemented by a corresponding IGBT or MOS transistor having a corresponding associated diode, as is schematically shown in FIG. 3a.

Figure 4:
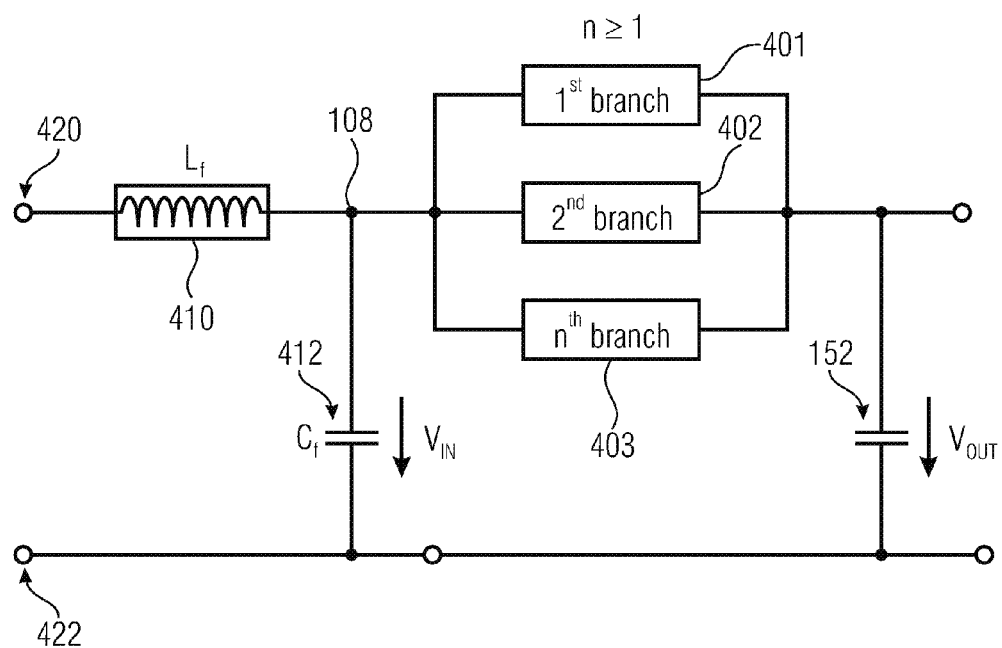
FIG. 4 shows a switching power supply of FIG. 1 comprising an upstream LC filter.

In an embodiment of the present invention, the power supply further includes an LC filter stage as is shown in FIG. 4. In particular, FIG. 4 shows the input node 108, parallel branches 401, 402, 403, as well as the output node 152. The LC filter includes the inductance 410 designated by $L_1$ and a capacitance 412 designated by $C_f$. A three-phase current of the mains may be connected at an input node of the inductance 410, said node being designated by 420, it being advantageous, in particular, to feed one phase of the three phases of the three-phase current of the mains between the node 420 and the ground node 422. Thus, it is apparent from FIG. 4 that the three parallel branches of the switching power supply 401, 402, 403 are connected between the two capacitors 412, 152.

The functionality of the switching power supply in FIG. 1 or FIG. 4 is advantageous particularly in that the currents mutually superimpose on the output side, so that a small ripple is obtained. Thus, the seeming "disadvantage" of the large current swing is compensated for by this since the currents and, thus, the corresponding magnetic fields mutually superimpose inside the circuit volume. In addition, switching-off of the respectively second transistors, i.e., switching of the second transistors from the switched-on state to the blocked state at the point in time when the current flowing inside the corresponding coil is already negative, results in that the losses caused by the switching are minimal.

In addition, it is particularly advantageous that with relatively long dead times, the respectively first switch can be switched on once the second switch has been switched off. The dead time, which may be up to one microsecond, is large enough so that no particular synchronization stages etc. are required. Switching on a power transistor during said dead time is not difficult. Thus, the requirements placed upon the controller 160 are relatively reduced, so that said implementation, too, can be provided at low cost and with little expense in terms of labor.

In addition, it shall be noted that the transistor pairs in the individual branches need not operate in a manner that is precisely offset in time, but in a manner that is only roughly offset in time. If the offset in time is not optimally spread across a cycle, the only result thereof will be a slightly larger ripple which, however, will anyway be filtered by the coils and the filter capacitor 152.

Figure 3B:
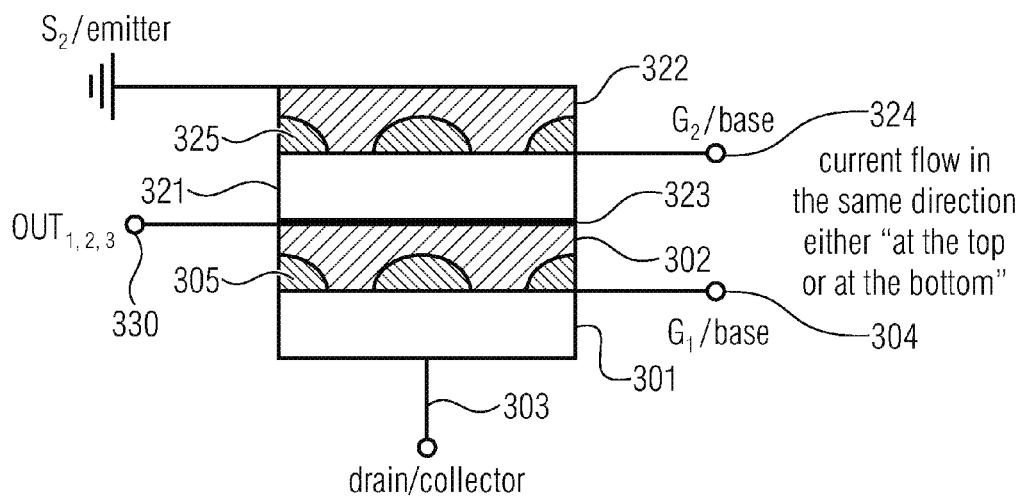
FIG. 3b shows a transistor stack circuit in accordance with an embodiment.

A further aspect of the present invention relates to a transistor stack circuit as is schematically shown in FIG. 3a and in an implementation in FIG. 3b. In particular, a transistor stack circuit includes a first transistor element 300 and a second transistor element 320. The first transistor element 300 includes, for example, a first semiconductor area 301 comprising a front side which has a first source or emitter metallization 302 formed thereon. Moreover, the first semiconductor area 301 includes a rear side having a first drain or collector contact 303 formed thereon. In addition, the first transistor element includes a first gate or base contact 304.

The second transistor element 320 includes a second semiconductor area 321 comprising a second front side on which a second source or emitter metallization 322 is formed, and comprising a rear side on which a second drain or collector contact 322 is formed, the second transistor element further comprising a second gate or base contact 324. The second drain or collector contact 322 is arranged in a stacked manner on the first source or emitter metallization 302 and is connected thereto in a conducting manner. Moreover, an output contact 330, which is also referred to by $OUT_1$, $OUT_2$, $OUT_3$ in FIG. 3b or in FIG. 1, is connected to the second drain or collector contact and to the first source or emitter metallization 302.

As was already depicted by means of FIG. 1, the transistor stack circuit advantageously also includes the controller 160, the first gate or base contact 304 and the second gate or base contact 324 being connected to the controller 160, and the controller being configured to operate the first gate or base contact 304 and the second gate or base contact 324 such that the first transistor element is conducting when the second transistor element is non-conducting, and vice versa.

As was already explained, the first transistor element and the second transistor element are configured as power elements, i.e., as an IGBT or MOS power transistor. In the case of an MOS power transistor, the transistor includes a source contact, a drain contact, and a gate contact, whereas in the case of an IGBT power transistor, the switch comprises an emitter contact, a base contact, and a collector contact.

The emitter, or source, metallization 322 is advantageously configured to comprise a multitude of source or emitter regions arranged in the manner of an array, while the rear side of the first semiconductor area 301 or of the second semiconductor area 321 is metallized throughout as a rear-side metallization.

Figure 3C:
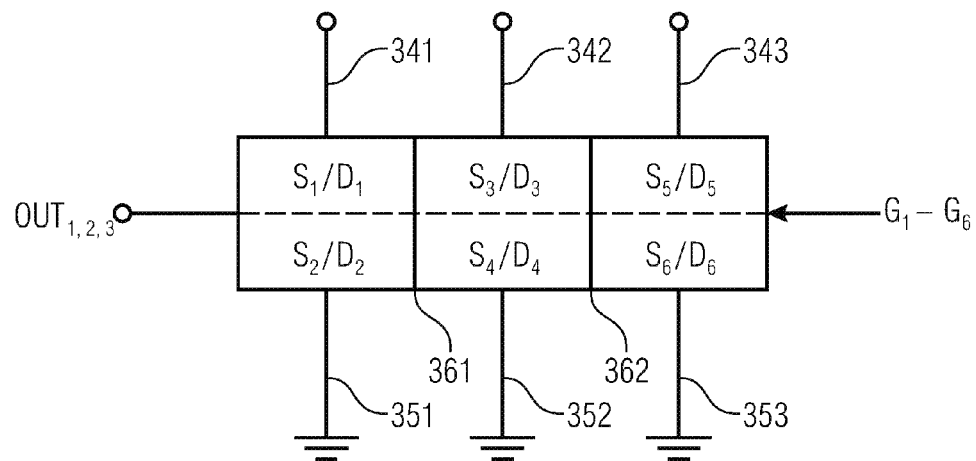
FIG. 3c shows a transistor stack circuit comprising several pairs of controllable switches.

FIG. 3b shows a transistor stack comprising two switches arranged one above the other. In addition, FIG. 3c shows a transistor stack circuit comprising three pairs of switches as might be employed in the implementation shown in FIG. 1, for example. In addition to the pair of switches $S_1$ and $S_2$, a further pair of switches $S_3$ 120 and $S_4$ 122 is provided, and a further pair of switches $S_5$ 130 and $S_6$ 132 is provided, it being advantageous for the diodes to be also formed between the source and the drain, or the emitter and the collector, respectively, in the transistor implementations.

Moreover, the transistor stack circuit includes six gate terminals $G_1$ to $G_6$ and three mutually separate output terminals $OUT_{1,2,3}$, which come out separately, advantageously in a lateral manner. Moreover, the drains, or collectors, of the individual circuits are separately shown at 341, 342, 343 even though, as is shown in FIG. 1, said drain/collector terminals are short-circuited with one another. The same applies to the three ground terminals 351, 352, 353, which are also separately shown, even though said ground terminals may also be short-circuited, as can also be seen in FIG. 1.

Advantageously, the pairs of switches $S_3$, $S_4$ are formed exactly in the manner shown in FIG. 3b. The same applies to the pairs of switches $S_5$ and $S_6$. In addition, it is advantageous for the pairs of switches as are shown in FIG. 3c to be insulated from one another in a lateral manner in each case, i.e., such that an insulation is present between $S_1$ and $S_3$, for example, or $S_2$ and $S_4$, or $S_3$ and $S_5$, or $S_6$ and $S_4$, i.e., at the interfaces 361, 362. Such insulation may be created, for example, by a sawing edge as occurs in chip dicing and which may or may not be filled with a dielectric.

It is advantageous, in particular, to form transistors, e.g. $S_1$, $S_3$, $S_5$, on the same planar substrate as $S_2$, $S_4$, $S_6$. Subsequently, the dicing edges are provided between the individual transistors, i.e., at the connecting lines 361, 362; however, the three adjacent transistors such as $S_1$, $S_3$, $S_5$, for example, are not completely diced. Following this, the individual transistor groups consisting of $S_1$, $S_3$, $S_5$, on the one hand, and $S_2$, $S_4$ and $S_6$, on the other hand, are is stacked on top of one another, as shown by means of a pair in FIG. 3b. Attachment is uncritical since the rear-side metallization of the upper semiconductor element 321 is simply connected to the emitter/source metallization of the lower transistor in a conductive manner, which may occur by means of alloying or conductive adhesion, for example. FIG. 3b further shows an insulating layer 305, or 325, so as to indicate that the emitter/source metallization is obviously insulated from the respective base, or the respective gate region.

By means of the controller 160, the two transistors stacked upon each other in FIG. 3b are driven in such a manner that they are conducting at different points in time. Therefore, the current flows only within different planes, but other than that it flows in the same direction. This means that magnetic fields present on account of the current do not mutually interfere when switchover of the transistors takes place. Instead, the magnetic field and, in particular, the direction of the magnetic field around the current do not change since the current merely flows at different "stories", but not in different directions, when switchover is effected.

Figure 6A:
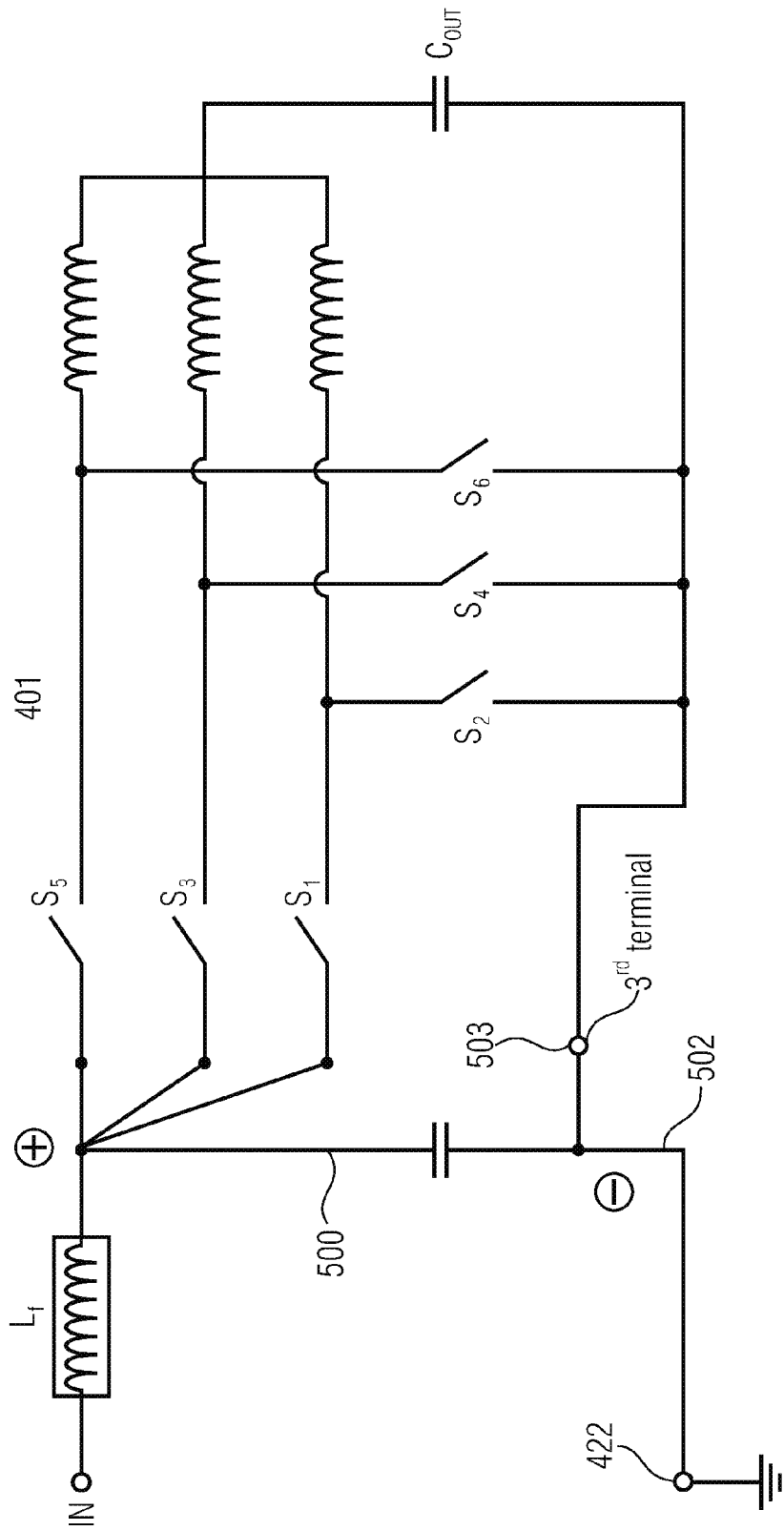
Figure 6B:
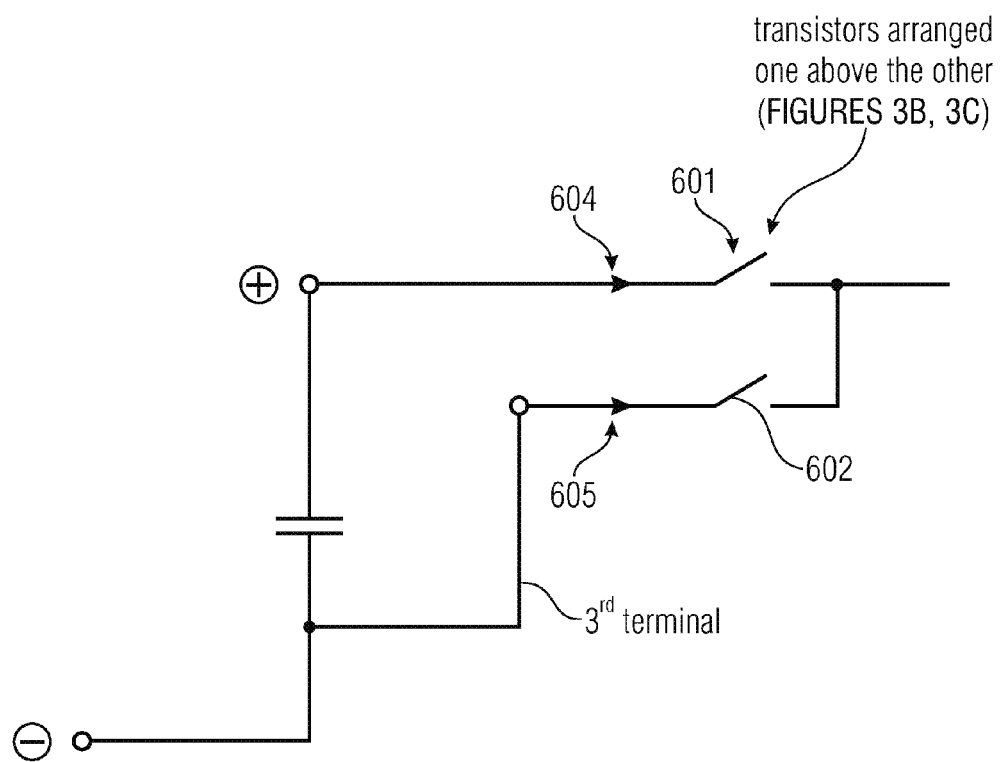
FIG. 6b shows a circuit from a capacitor of FIG. 5a with a transistor stack circuit of FIG. 3b.

This principle can also be seen in FIG. 6b, which schematically shows the current flow in different stories, as is achieved by the transistor stack arrangement of FIG. 3b or FIG. 3c. The upper switch 601 in FIG. 6b represents the transistor comprising the semiconductor element 301, and the lower switch 602 of FIG. 6b represents the transistor comprising the semiconductor element 321 of FIG. 3b.

Figure 5A:
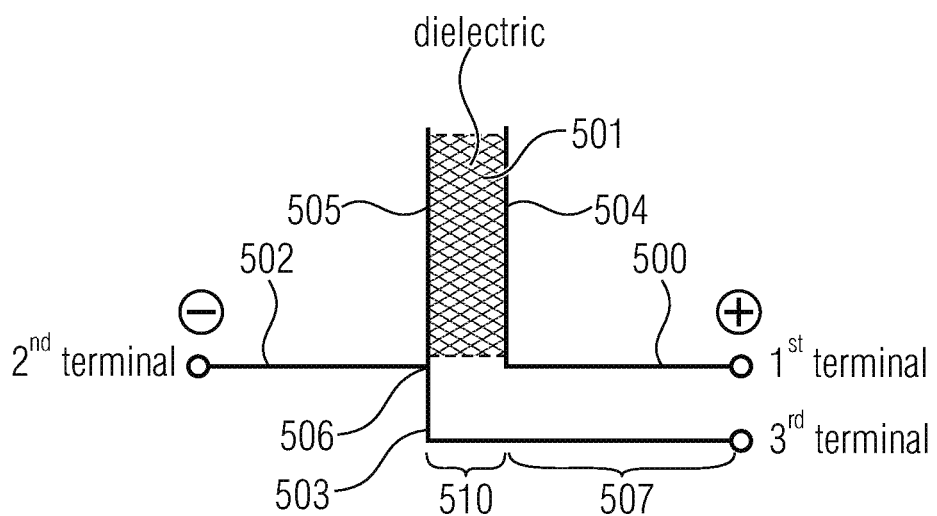
FIG. 5a shows an implementation of a capacitor comprising a third terminal lead in accordance with an embodiment of the present invention.

FIG. 5a represents a capacitor in accordance with a further aspect of the present invention. The capacitor includes a first terminal lead 500 for connecting a positive potential, which is schematically depicted by a "+" in FIG. 1a. The capacitor further includes a second terminal lead 502 for connecting a negative potential, which is depicted by a "−" in FIG. 5a. Moreover, a dielectric 501 is provided which is arranged between a positive electrode 504 connected to the first terminal lead 500, and a negative electrode 505 connected to the second terminal lead 502. In addition, a third terminal lead 503 is provided which is connected to the second terminal lead 502 at a branching 506 and which further extends along the first terminal lead 500 within an area 507, but is insulated from the first terminal lead.

Figure 5B:
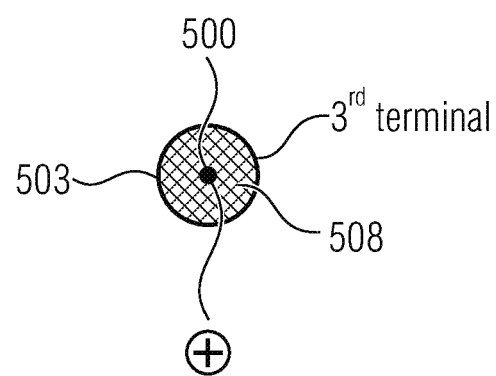
FIG. 5b shows a top view of an implementation of the pair consisting of the first terminal lead and the third terminal lead.
Figure 5C:
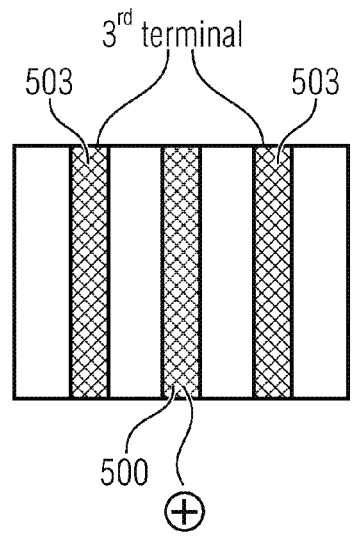
FIG. 5c shows an alternative implementation of the third terminal with regard to the first terminal on a planar circuit.

A "coaxial implementation", as it were, between the first terminal lead 500 and the third terminal lead 503 within the area 507 is shown in FIG. 5b, the first terminal lead 500 being fully surrounded by the third terminal lead, and an intermediate area advantageously being provided with a dielectric 508, it being possible, however, for said dielectric to be simply air, depending on the configuration and length of the area 507. An alternative form is a stripline configuration. As is shown in FIG. 5c, the first terminal lead 500 is configured as a stripline on a substrate, whereas the third terminal 503 is advantageously formed on both sides in order to be arranged close to the first terminal lead 500.

Arranging the third terminal lead next to the first terminal lead ensures that switchover may also occur at low loss again since—irrespective of whether a large current flows inside the first terminal lead or the third terminal lead—the magnetic field caused by this current is the same since a current flows either in the third terminal lead or in the first terminal lead, but apart from that, it flows in the same direction.

Advantageously, the capacitor includes a resin housing, which is not shown in FIG. 5a but which surrounds the dielectric, the two electrodes 501, 505, and the branching 506. Three terminal leads, namely the first terminal lead 500, the second terminal lead 502, and the third terminal lead 503, extend out of the resin housing, the third terminal lead being located in the vicinity of the first terminal lead at the resin housing, however, and therefore being located clearly further apart from the second terminal lead 502 than from the first terminal lead 501. Moreover, as is also shown in FIG. 5a, the third terminal lead includes a portion extending within the area 507, i.e., extending next to the first terminal lead, whereas, in addition, the third terminal lead comprises a further area 510 extending next to the dielectric 501. Thus, the third terminal lead consists of the branching 506, of the second portion 510 extending next to the dielectric 501, and of the first portion 507 extending along the first terminal lead and out of the resin housing, or, generally, out of the housing.

Figure 5D:
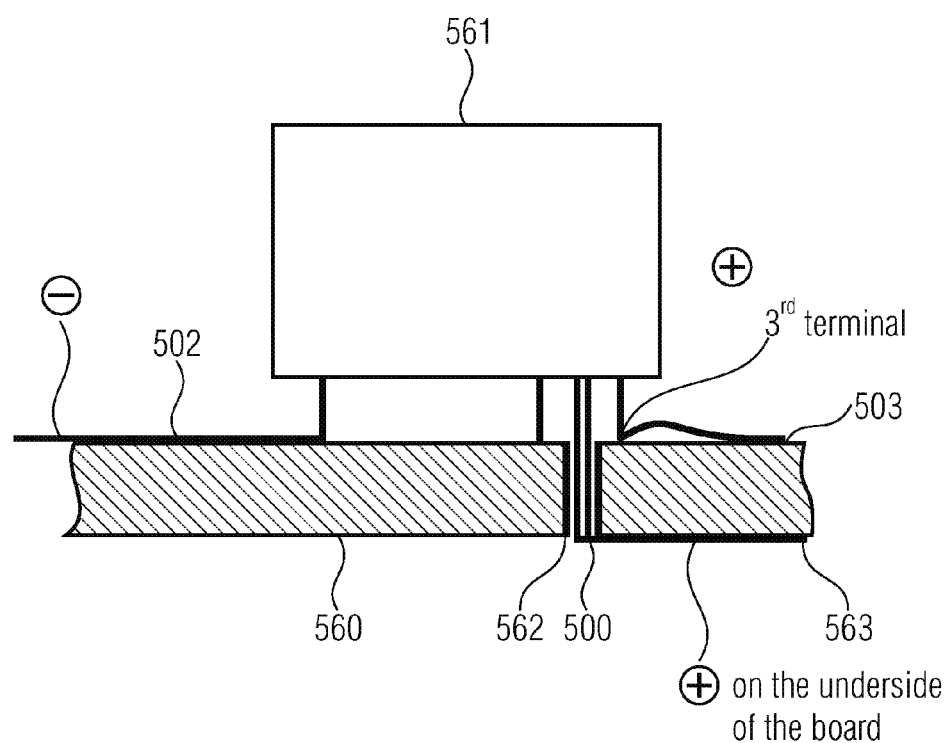
FIG. 5d shows a sectional view of the mounting of the capacitor on a board with a first terminal lead routed through the board.

In addition, in an embodiment, the third terminal lead is configured with a certain thickness, a distance of the third terminal lead from the first terminal lead being smaller than a thickness of the third terminal lead. FIG. 5d shows an implementation, or arrangement, of the capacitor on a board 560. In particular, the resin housing 561 of the capacitor as well as the first terminal lead 500, the second terminal lead 502, and the third terminal lead 503 are shown. In particular, in the embodiment shown in FIG. 5d, the first terminal lead 500 for connecting the positive potential extends through the substrate 560 by means of a through hole 562 and is connected to a conductor line 563 located on the underside or rear side of the board 560, whereas the top side also has a conductor line provided thereon which is connected to the third terminal 503. The second connector 502 is also connected to a conductor line which, however, is not connected to the conductor line to which the third terminal 503 is connected.

FIG. 6a shows a schematic representation of the switching power supply of FIG. 1. FIG. 6a sets forth, in particular, that the first terminal lead 500 of the capacitor $C_f$ is to be connected to the drain/collector terminals of the respectively first transistors of the transistor pairs in the parallel branches, whereas the second terminal lead 502 is to be connected to the circuit ground 422. In addition, the third terminal 503 is to be connected to the emitter terminals of the respectively second, or lower, transistors of the transistor pairs. When looking at FIG. 6b, which schematically depicts the transistor stack circuit of FIG. 3b, it can be seen that the third terminal is optimally suited for enabling low-loss operation of the switchover since the arrangement of the third terminal, or, actually, the presence of the third terminal, results in that optimum current distribution takes place with regard to the stacked transistors, such that current conduction 604, or 605, takes place in the upper, or, in an alternating manner, the lower "branch", but in the same direction, so that the resulting magnetic field as seen from the outside remains almost unchanged by the "change of stories" of the current flow as is depicted in FIG. 3b. This results in that no re-magnetizations are required, and thus, no losses associated with re-magnetizations occur.

Figure 5E:
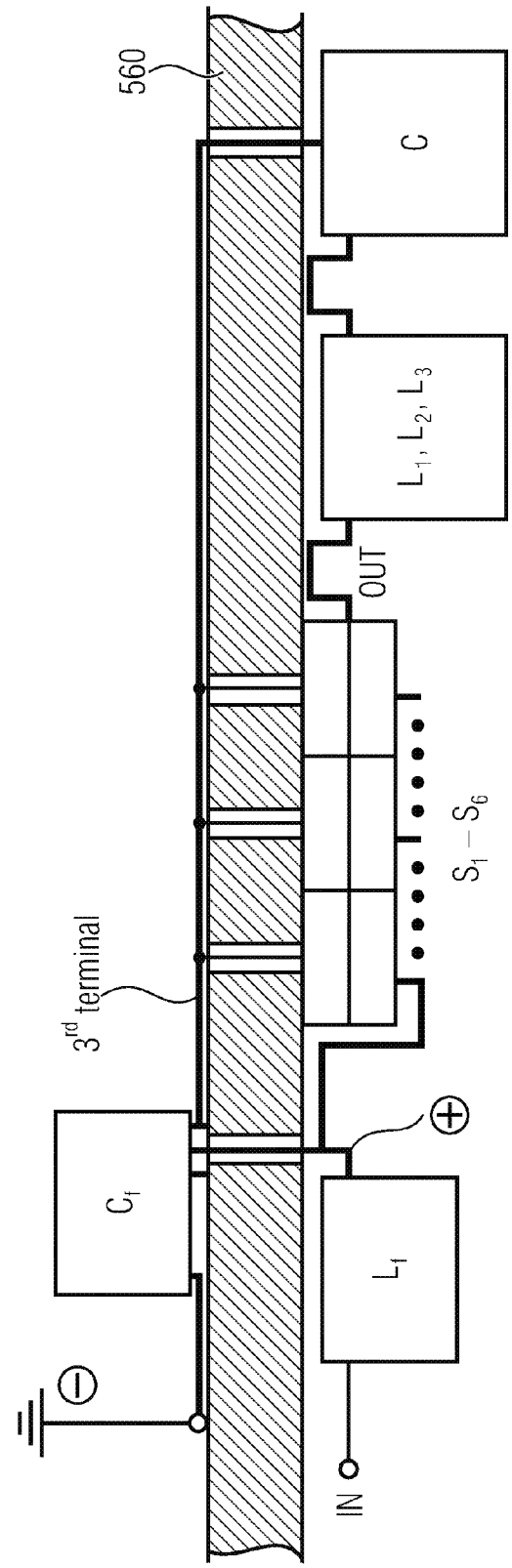
FIG. 5e shows a sectional representation through a board having a capacitor arranged on the board and having transistor stack circuits and inductances arranged on the rear side of the board.

FIG. 5e shows an implementation of the switching power supply by way of a board such as the board 560, for example, that was already shown in FIG. 5d. In particular, $C_f$ as was shown in FIG. 5a was arranged on the one side of the board, whereas the coil $L_f$ as well as the transistor stack circuit as is schematically depicted by $S_1$ to $S_6$ are mounted on the other side of the board. Even though FIG. 5e shows that three through holes extend from the respective pairs of switches to the third terminal, or to the conductor line connected to the third terminal, it shall be noted that a single through hole or only two through holes are also sufficient since these three lines are short-circuited anyway. In addition, FIG. 5e shows that a coil array consisting of coils $L_1$, $L_2$, $L_3$ is also arranged on the underside of the board 560 even though the coil array or also the capacitor C, which corresponds to the output capacitor $C_{OUT}$ of FIG. 6a, for example, or to the capacitor 152 of FIG. 1, might be arranged on the top side as well. The arrangement on the board 560 with regard to the representation in FIG. 5e may also be changed, so that the capacitor $C_f$ is arranged on the underside of the board and that at least the transistor stack circuit is arranged on the top side.

Figure 7A:
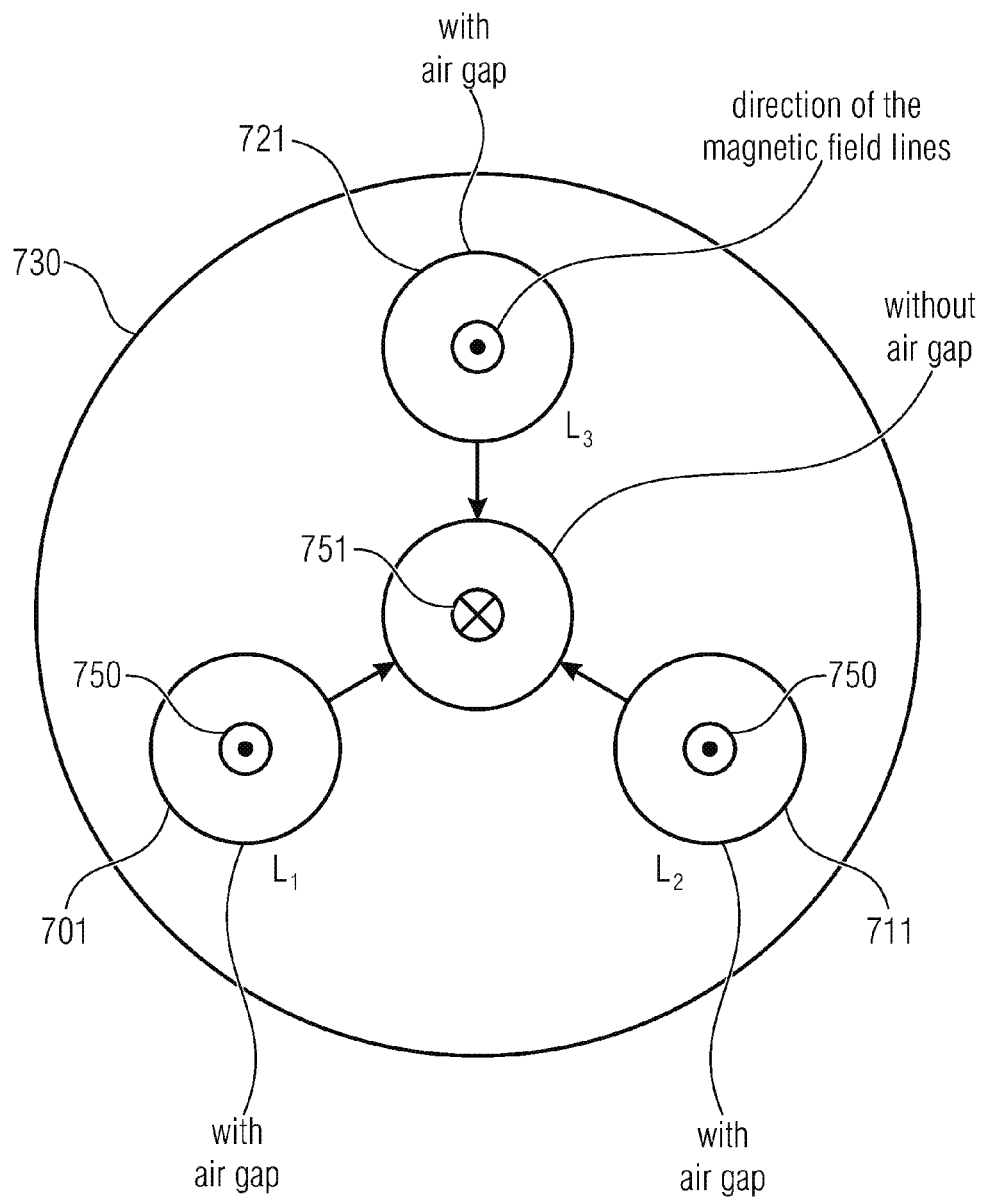
FIG. 7a shows a coil array in accordance with an embodiment in a schematic top view.
Figure 7B:
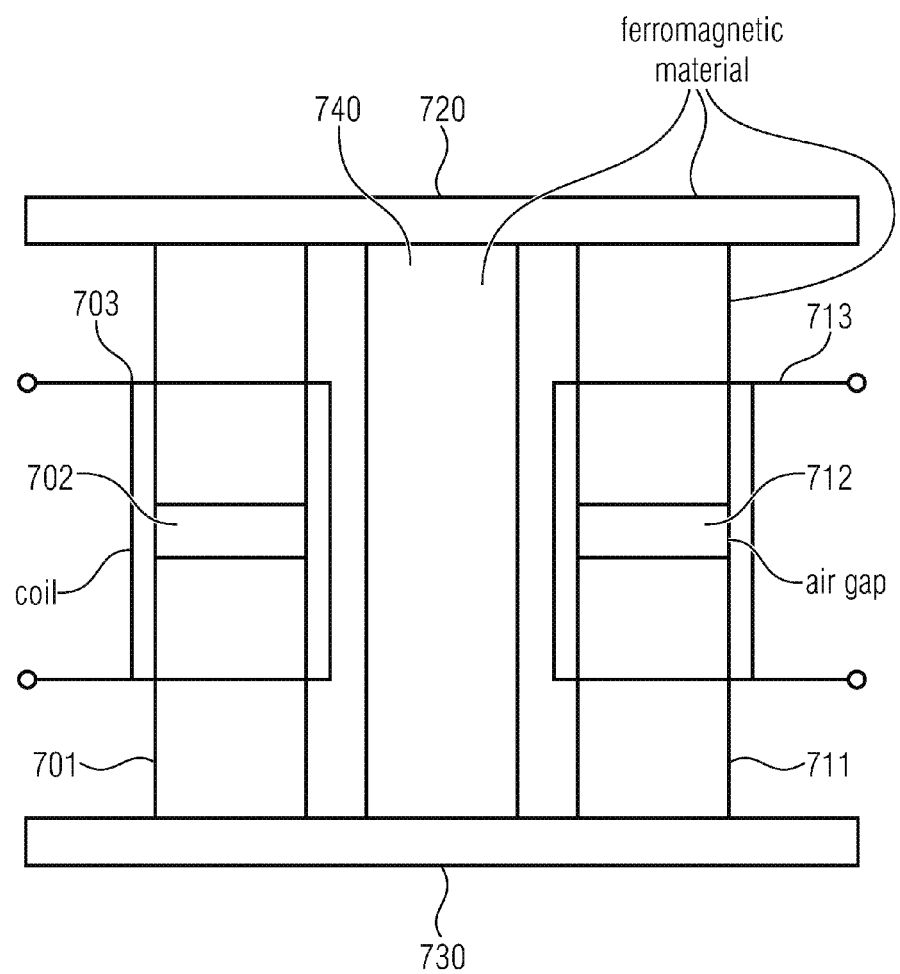
FIG. 7b shows a coil array of FIG. 7a in a schematic sectional representation.

FIGS. 7a to 8c show features of a coil array in accordance with a further aspect. In particular, a coil array includes a first bar 701 comprising a first gap 702 and a first winding 703 which advantageously extends across the first gap 702. In addition, a second bar 711 comprising a second gap 712 and a second winding 713, which advantageously extends across the second gap 712, is provided. While FIG. 7b shows a cross section, FIG. 7a shows a top view of the element, however with a lid element 720 being removed. Thus, FIG. 7a is a top view of the bars 701, 711, and 721 and of the floor element 730 that is connected to a different end of each of the first and second bars, whereas the lid element is connected to the one end of each of the first and second bars, as can best be seen in cross section in FIG. 7b. The cross section in FIG. 7b further schematically shows a loopback bar, or backflow path bar, 740 which is made from a ferromagnetic material just like the bars 701, 711, 721 but provides no gap, or air gap. The loopback bar 740 is provided for closing the magnetic field circuits. In FIG. 7a, the direction of the magnetic field lines is drawn in at 750 such that the magnetic field lines come out of the drawing plane and extend into the drawing plane via the loopback bar 740, as is outlined at 751. Thus, the magnetic circuits for all three coils $L_1$, $L_2$, and $L_3$ are closed. As is shown in FIG. 7a, the coil array may generally comprise two, three, four or even more individual coils, the windings of which all are configured such that the field lines inside the bars having air gaps and being provided with windings run in the same direction, and run in the other direction via the loopback element 740.

When using the coil array within a switching power supply, some, or the positive, terminals of the individual coils, are separate from one another, whereas the other, or negative, terminals or ground terminals of the coils may be at the same potential, i.e. may be short-circuited.

It is generally advantageous to use k bars having one air gap each, wherein k≥3. Moreover, as is schematically shown in FIG. 7a for the case of k=3, a loopback bar is generally arranged between the k bars, so that an axis of the loopback bar forms a center of a circle on which the axes of the k bars are arranged, angles between two axes, respectively, being identical within a tolerance range, the tolerance range being ±10% of 360° divided by k. In the embodiments shown in FIG. 7a, an angle between two adjacent axes of bars is 360 divided by 3, i.e., 120°, so that the tolerance range is ±10% of 120°, i.e. so that an angle between two axes ranges from 108° to 132°. When k equaling 4 bars having four coils and, thus, four parallel branches is employed, the angle between two adjacent coils will be 90°, and the tolerance range will be at 90°±9°.

For example, when six coils are used, the angle between two adjacent bar axes will be 60°, and the tolerance range will be ±6°. It is advantageous to distribute the individual coils across a circle in as uniform a manner as possible since in this case, the field line loopback via the loopback bar 751 works in a particularly smooth and trouble-free manner, which in turn results in a good performance of the coil array in terms of electromagnetic compatibility and losses.

Figure 8A:
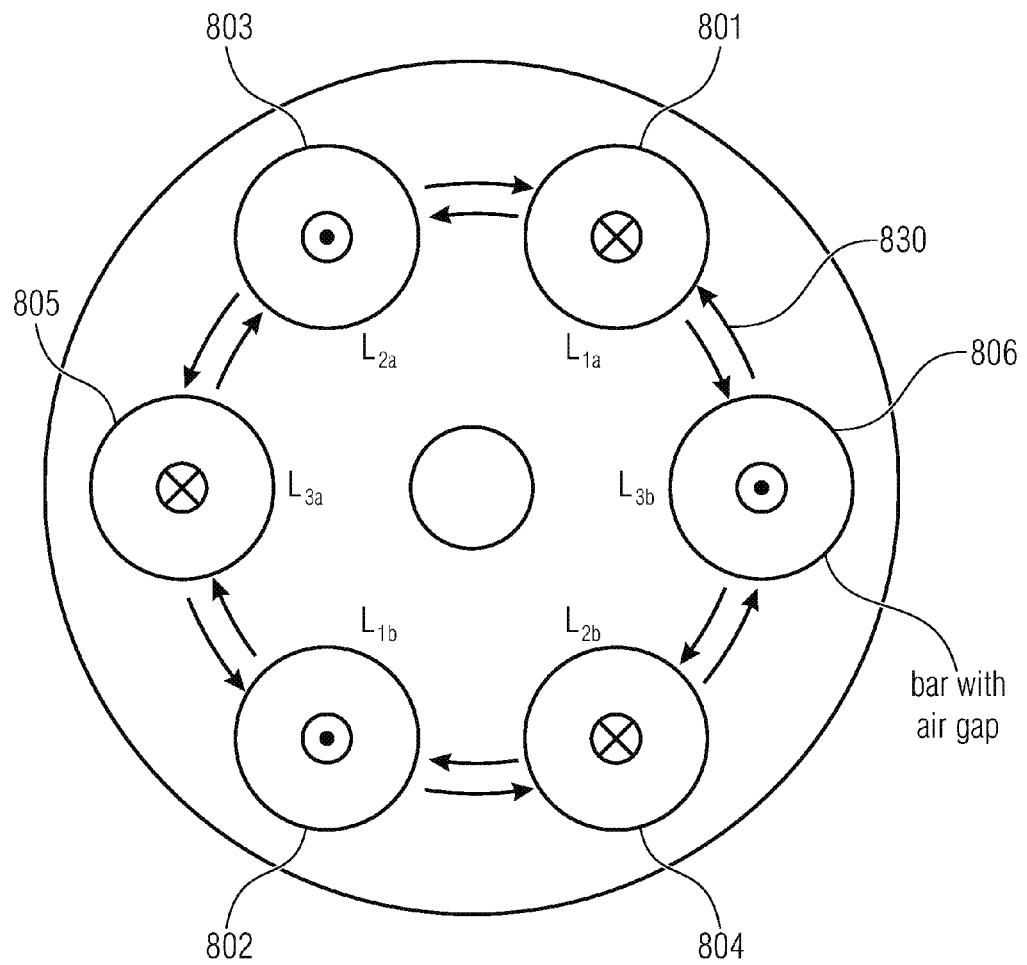
FIG. 8a shows a coil array in accordance with a further embodiment.
Figure 8B:
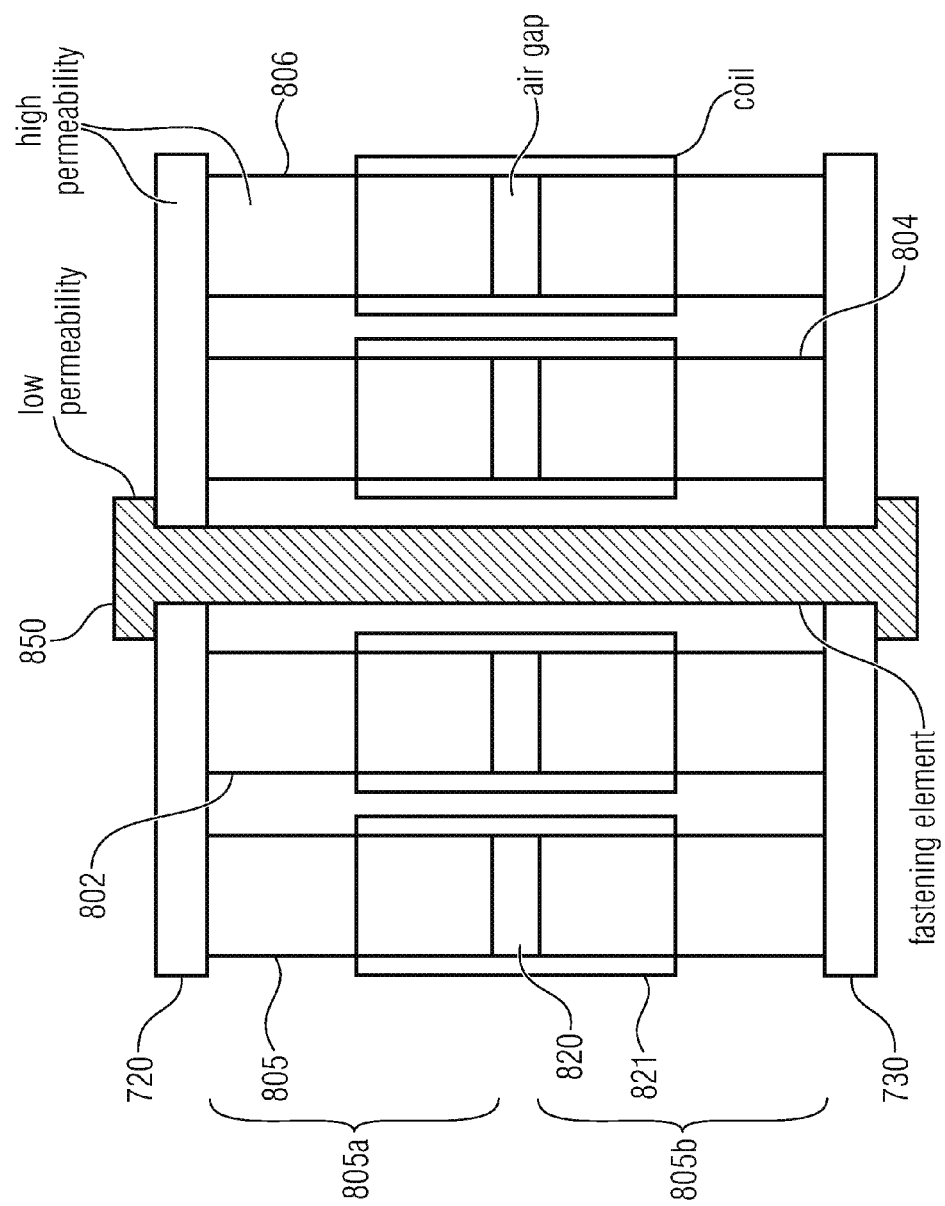
FIG. 8b shows a cross section through a coil array of FIG. 8a in a schematic representation.

FIGS. 8a to 8c show an alternative embodiment of the coil array wherein, unlike FIG. 7a, no separate loopback element is provided, but the field line loopback may take place in an adjacent coil. For this purpose, each coil of FIG. 1 is subdivided, e.g., into two or more parts, as is schematically shown in FIG. 8a, FIG. 8a again showing, by analogy with FIG. 7a, a schematic top view of the coil array comprising three coils and, thus, six coil sections with the lid element 720 removed. By analogy with FIG. 7a, a first bar comprising an air gap 801 and, in addition, a second bar 803, also comprising an air gap and a winding, are provided in FIG. 8a as well. Moreover, a third bar 802 and, in addition, a fourth bar 804 are provided. The second bar 803 is arranged between the first bar 801 and the third bar 802. Moreover, the third bar 802 is arranged between the second bar 803 and the fourth bar 804. Furthermore, the fourth bar 804 is arranged between the third bar 802 and the first bar 801.

In addition, the windings on the individual bars are serially formed with windings on other bars. In particular, the first winding on the first bar 801 is connected in series with the third winding on the third bar 802. Thus, the first winding, i.e. the winding on the bar 801, for example, which is designated by 811 in FIG. 8c, and the winding 812 connected in series on the third bar 802 of FIG. 8c form the first coil $L_1$ of the switching power supply as is depicted in FIG. 1, for example. Corresponding wirings are provided for forming the second coil, which is formed by windings around the bars 803, 804, as is shown by $L_{2a}$ and by $L_{2b}$ in FIG. 8. A similar arrangement exists for the third coil $L_n$ of FIG. 1, which is formed by the two windings around the bars 805, 806.

A side view, in a schematic form, of the coil array of FIG. 8a is shown in FIG. 8b. In particular, FIG. 8b shows the bars 805, 806 which together form the third coil and are therefore designated by $L_{3a}$ and $L_{3b}$ in FIG. 8a. The figure further shows an air gap and a winding arranged across the air gap, as is shown, e.g., at 820 at the air gap and at 821 for the winding. Moreover, FIG. 8b further shows, merely by way of example, the bar 802, which forms the second section of the first coil, i.e. $L_{1b}$, and the bar 804, which forms the second section of the second coil.

As is schematically depicted in FIG. 8a, the coils, or the windings around the corresponding bars, are connected such that magnetic field lines run inside the bars in an alternating manner, so that, for example, inside the bar 801, magnetic field lines extend into the drawing plane, and that inside the bar 806, magnetic field lines extend out of the drawing plane. Thus, the loopback for the magnetic field lines extending inside the bar 801 may take place across the two adjacent bars. This is shown by loopback arrows 830 in FIG. 8a. However, it shall be noted that with regard to the representation in FIG. 8c, the actual backflow, or loopback, of the field lines of $L_{1a}$ does not take place inside the bar 802, but inside the two adjacent bars 803, 806, which in the embodiment shown in FIG. 8a comprise three coils, i.e. six windings, or three pairs of windings.

Generally, the coil array of FIG. 8a includes, e.g., I bars having one air gap each, I being even-numbered and ≥4. In addition, it is advantageous for axes of the I bars to be arranged on a circle, angles between two adjacent axes, respectively, being identical within a tolerance range, the tolerance range being ±10% of 360° divided by I. Thus, for example, if I equals 6, the angle between two coils, i.e. between $L_{1b}$ and $L_{2b}$=60°±a tolerance of 6°.

In addition, one or more fastening elements 850 comprising comparatively low permeability are provided, the fastening element being arranged between the floor element 730 and the lid element 720 so as to hold the coil array together. As is shown in FIG. 8b, there may be a central fastening element, or, alternatively, fastening elements may be arranged that are distributed in any place desired and whose placement is not decisive since they do not have to provide a loopback, which is a difference as compared to the embodiment shown in FIG. 7a, wherein the loopback operates via an element that is to be used as a fastening element at the same time.

As is schematically indicated in FIG. 8b, each bar consists of a first bar section 805a extending from the lid element, and a second bar section 805b extending from the floor element. Moreover, an inlay, or lining, disk 820 is advantageously provided instead of the air gap, or as an implementation of the gap, said inlay disk being formed of a non-ferromagnetic material and representing the gap.

Thus, it is possible to provide a particularly favorable implementation of a coil array since important characteristics of the coil array can be achieved by using inlay disks 820 of different thicknesses. This involves keeping in stock identical lid and floor elements with already attached bar sections as well as corresponding inlay disks since in this case, easy assembly will be possible by fitting the corresponding windings, by fitting a floor or lid element with mounted bar sections following insertion of the inlay disks, and subsequent fastening by means of a fastening element 850.

Advantageous kinds of dimensioning for individual components of the described circuits will be set forth below. With regard to FIG. 4, inductances smaller than 100 pH are advantageous for the coil $L_1$ 410. In particular, values between 10 and less than 100 pH provide good results. The capacitance $C_f$ 412 in FIG. 4 is advantageously smaller than 10 µF, and in particular, values between 1 and less than 10 µF are particularly advantageous.

As was already set forth, the entire circuit in FIG. 1 and/or FIG. 4 is suitable for powers of 5 kW to be processed, wherein currents of the order of magnitude of 5 to 16 A can be used. From that point of view, the individual inductances $L_1$, $L_2$, $L_n$ lie within ranges smaller than 100 µH, and advantageously range from 1 to less than 100 µH.

Frequencies for controlling the individual cycles as are used by the controller 160 are at about 500 kHz; in particular, frequencies between 100 kHz and 1 MHz can be employed, depending on the requirement.

Dimensions for the coil arrays of FIGS. 7a to 8c are as follows: Advantageously, the shape of the coil array of FIG. 7a or FIG. 8a is cylindrical and has a height of 5 cm from the lower edge of the floor element to the upper edge of the lid element, it being possible, in principle, to also use values of between 2 cm and 7 cm. With a circular shape of the floor element or of the lid element, the diameter is 5 cm, it also being possible to use other diameters ranging from 3 to 7 cm.

As the material for the floor and lid elements and for the bars comprising air gaps or, as is shown in FIG. 7a, comprising no air gaps, a sintered material having good ferromagnetic properties is employed as is available, e.g., from the company Ferroxcube.

In this context, it shall also be noted that the shape of the lid element or the floor element need not necessarily be circular but may have any desired shape. On account of the circumstances of equal distances, a circular arrangement of the individual rods comprising windings as in FIGS. 8a, 7a is advantageous, even though the shape of the floor element and of the lid element may be arbitrary. However, a circular arrangement is not absolutely necessary. In particular when looking at FIG. 7a, the distance between the axis of the loopback bar 740 and a bar comprising an air gap may vary from bar to bar, so that the distances of the bars comprising air gaps from the loopback bar are not identical. In addition, the angles also need not necessarily be equally distributed. However, it is advantageous for the distance between a bar comprising an air gap and the loopback bar to be smaller than the distance between two adjacent bars comprising air gaps.

With regard to FIG. 8a it shall be noted that likewise, an ideal circular arrangement is advantageous but not absolutely necessary. In addition, the distances between the individual bars comprising air gaps and the fastening element 150 and/or a central axis of the coil array also need not necessarily be identical for all bars comprising air gaps. Moreover, the distances of the individual bars from the adjacent bars need not necessarily be identical, even though as symmetrical an arrangement as possible is advantageous since in this case the field lines will distribute across the two adjacent coils in an optimum manner so as to provide their loopback.

In addition, the windings such as 821, for example, on the bars are arranged, both in FIG. 8a and FIG. 7a, across the air gap such as 820, for example. Corresponding arrangements are also shown in FIG. 8c. However, this is not absolutely necessary. For example, the air gap inside the bar might also be located above the winding and below the winding.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Switching power supply comprising:
   a plurality of parallel branches, each parallel branch comprising two serially connected controllable switches and a coil connected between the two switches and an output node;
   a capacitor connected between the output node of the parallel branches and ground, and
   a controller configured to switch the two serially connected controllable switches of each parallel branch such that a first switch of a parallel branch is switched from a conducting state to a non-conducting state when a current flowing through a coil of the parallel branch reaches a first current value larger than 5 A, and such that the second switch is switched from a conducting state to a non-conducting state when the current flowing through the coil of the parallel branch reaches a second current value smaller than 0 A,
   an LC filter comprising a filter capacitor and a filter coil and being connected upstream from the plurality of parallel branches, so that an input node of each parallel branch is connected to a first terminal of a filter capacitor and to a first terminal of a filter coil, a second terminal of the filter capacitor being connected to a ground terminal, and a second terminal of a filter coil being connected to an input node of the switching power supply, wherein the filter capacitor comprises a positive terminal, a negative terminal, and a third terminal, the third terminal comprising an elongated lead connected to the negative terminal and being arranged at least partly next to the positive terminal,
   a board, the filter capacitor being arranged on one side of the board and the switches and the coils being arranged on another side of the board, a positive terminal of the filter capacitor extending through a bore through the board, the third terminal, which comprises a ground path, being arranged, on the one side of the board, next to the bore within the board for the positive terminal, and one or several ground terminals of the second switches extending through the board and being connected to the third terminal of the filter capacitor.

2. Switching power supply as claimed in claim 1, wherein the first current value is between 9 and 12 A, and the second current value is between −0.2 and −2 A.

3. Switching power supply as claimed in claim 1, wherein at least the second switch of each parallel branch comprises a diode connected in parallel and being polarized such that a current smaller than 0 A can flow through the diode.

4. Switching power supply as claimed in claim 1,
   wherein the controller is further configured to switch the first switch of the parallel branch from a non-conducting state to a conducting state, in a manner that is delayed by a dead time, after switching the second switch from the conducting state to the non-conducting state, the dead time being larger than 100 ns and smaller than 1 µs.

5. Switching power supply as claimed in claim 1,
   wherein the controller is configured to switch the switches of a further parallel branch in a manner that is offset in time to the switches of the parallel branch, so that currents flowing through the coils of the parallel branch and of the further parallel branch are different at one point in time.

6. Switching power supply as claimed in claim 1,
   wherein a number k of parallel branches is configured, k being larger than or equal to 2, and the controller being configured to drive the switches of the k parallel branches in a manner that is offset in time such that within a cycle, switch-off times of the switches are equally distributed within a tolerance range, a cycle starting at the first current value and ending at a temporally successive first current value for the same parallel branch, the tolerance range being equal to the cycle length divided by k times±10%.

7. Switching power supply as claimed in claim 1,
   wherein the parallel branches and the capacitor are dimensioned such that a power larger than 2 kW can be output at the output node.

8. Switching power supply as claimed in claim 1,
   wherein the two switches of each parallel branch are configured as stacked transistors, an emitter or source metallization of the second switch being connected to a ground node, a collector or drain metallization being stacked, on a semiconductor rear side of the second switch, onto an emitter/source metallization of the second switch and being connected to the coil of the parallel branch, and a collector or drain metallization on a semiconductor rear side of the first switch representing an input terminal.

9. Switching power supply as claimed in claim 1,
   wherein the third terminal of the filter capacitor is connected to a terminal of the second switch of each parallel branch, another terminal of the second switch, which is not a control terminal of the second switch, being connected to the first switch.

10. Switching power supply as claimed in claim 1,
    wherein the coils of the plurality of parallel branches are arranged on a ferromagnetic body, so that each coil extends across a ferromagnetic bar comprising an air gap so as to provide an inbound path for field lines, and wherein an outbound path for field lines is further configured which comprises a ferromagnetic bar without an air gap or a neighboring coil with an opposite sense of winding or an opposite winding polarity.

11. Switching power supply as claimed in claim 1, further comprising:
    inside each or at least two parallel branches, a current sensor, each current sensor being connected to the controller, and each current sensor being configured to detect the first current value and the second current value.

12. Method of operating a switching power supply comprising a plurality of parallel branches, each parallel branch comprising two serially connected controllable switches and a coil connected between the two switches and an output node; and a capacitor connected between the output node of the parallel branches and ground, an LC filter comprising a filter capacitor and a filter coil and being connected upstream from the plurality of parallel branches, so that an input node of each parallel branch is connected to a first terminal of a filter capacitor and to a first terminal of a filter coil, a second terminal of the filter capacitor being connected to a ground terminal, and a second terminal of a filter coil being connected to an input node of the switching power supply, wherein the filter capacitor comprises a positive terminal, a negative terminal, and a third terminal, the third terminal comprising an elongated lead connected to the negative terminal and being arranged at least partly next to the positive terminal, a board, the filter capacitor being arranged on one side of the board and the switches and the coils being arranged on another side of the board, a positive terminal of the filter capacitor extending through a bore through the board, the third terminal, which comprises a ground path, being arranged, on the one side of the board, next to the bore within the board for the positive terminal, and one or several ground terminals of the second switches extending through the board and being connected to the third terminal of the filter capacitor, comprising:

controlling the two switches of each parallel branch such that a first switch of a parallel branch is switched from a conducting state to a non-conducting state when a current flowing through a coil of the parallel branch reaches a first current value larger than 5 A, and such that the second switch is switched from a conducting state to a non-conducting state when the current flowing through the coil of the parallel branch reaches a second current value smaller than 0.

13. Method as claimed in claim 12, further comprising:

switching the first switch of the parallel branch from a non-conducting state to a conducting state, in a manner that is delayed by a dead time, after switching the second switch from the conducting state to the non-conducting state, the dead time being larger than 100 ns and smaller than 1 µs, and switching the second switch from a non-conducting state to a conducting state, in a manner that is delayed by a dead time, after switching the first switch from the conducting state to the non-conducting state, the dead time following said switching of the first switch from the conducting state to the non-conducting state being equal to the dead time following said switching of the second switch from the conducting state to the non-conducting state or being different from said dead time and ranging from 100 ns to 1 µs.

\* \* \* \* \*